United States Patent [19]
Goodell et al.

[11] Patent Number: 6,046,375
[45] Date of Patent: Apr. 4, 2000

[54] DEGRADATION AND PROTECTION OF ORGANIC COMPOUNDS MEDIATED BY LOW MOLECULAR WEIGHT CHELATORS

[75] Inventors: Barry S. Goodell; Jody L. Jellison, both of Bangor, Me.; Jing Liu, Rutland, Vt.; Srinivasan Krishnamurthy, Piscataway, N.J.

[73] Assignee: The Board of Trustees University of Main System, Bangor, Me.

[21] Appl. No.: 08/838,771

[22] Filed: Apr. 10, 1997

Related U.S. Application Data

[60] Provisional application No. 60/015,353, Apr. 12, 1996.

[51] Int. Cl.[7] .............................. A62D 3/00; C02F 1/72; C02F 1/78
[52] U.S. Cl. ............................ 588/207; 8/111; 210/763; 210/909; 252/186.38; 252/186.39; 252/186.41; 252/400.53; 428/541; 588/218
[58] Field of Search ........................ 252/186.38, 186.39, 252/186.41, 400.53; 8/111; 588/207, 218; 428/541; 423/576.6; 210/763, 909

[56] References Cited

U.S. PATENT DOCUMENTS

| | | | |
|---|---|---|---|
| 3,869,401 | 3/1975 | Ernst ........................................ | 8/111 X |
| 4,220,688 | 9/1980 | Mitchell et al. .......................... | 428/541 |
| 4,392,975 | 7/1983 | Tourdot et al. ................. | 252/186.38 X |
| 4,728,455 | 3/1988 | Rerek ............................. | 252/186.38 X |
| 4,931,167 | 6/1990 | Wilwerding .............................. | 208/262 |
| 5,084,066 | 1/1992 | Arifoglu et al. ............................ | 8/111 |
| 5,202,052 | 4/1993 | Zenner et al. .................. | 252/400.53 X |
| 5,232,484 | 8/1993 | Pignatello ............................... | 588/206 |
| 5,345,031 | 9/1994 | Schwartz et al. ........................ | 588/206 |
| 5,345,032 | 9/1994 | Marks et al. ............................. | 588/207 |
| 5,389,356 | 2/1995 | Aust et al. ............................... | 423/659 |
| 5,436,160 | 7/1995 | Varadaraj et al. ........................ | 435/264 |
| 5,622,646 | 4/1997 | Scialla et al. ................... | 252/186.38 X |

OTHER PUBLICATIONS

"Cellulose as a Chemical and Energy Resource. Symposium 5." *Biotechnology and Bioengineering.* Wilke, C.R. (ed), John Wiley & Sons, New York. 5:151–159 (1975).
Backa et al. *Holzforschung* 46:61–67 (1992).
Barr et al. *Arch. Biochem. Biophys.* 289:480–485 (1992).
Chandhoke, V. et al. *FEMS Microbiology Letters* 90:263–266 (1992).
Chen, Y. and Jellison, J. "Regulation of Hyphal Sheath Formation and Iron–Chelator Production by the Brown–Rot Fungi *Gloeophyllum trabeum* and *Postia placenta.*" *Res. Group on Wood Preservation,* Stockholm, Sweden. Doc IRG/WP/_ (1994).
Connolly, J.H. and Jellison, J. *Int'l. Res. Group on Wood Preservation, Stockholm, Sweden.* Doc IRG/WP/94–10075 (1994).
Espejo and Agosin. *Appl. Environ. Microbiol.* 57:1980–1986 (1991).
Fekete, F.A. et al. *Applied and Environmental Microbiology* 55/10:2720–2722 (1989).

Grace, J.K. et al. Proceedings, Hawaiian Entomolocgical Society 31:249–252 (1992).
Higuchi, T. *Wood Sci. and Tech.* 24:23–63 (1990).
Hyde and Wood. *Int'l. Res. Group Wood Preservation Series,* Stockholm, Sweden. Doc. IRG/WP 95–10104 (1995).
Illman et al. *Int'l . Res. Group on Wood Preservation,* Stockholm, Sweden. Doc. No. IRG/WP/1360 (1988).
Jellison, J. et al. "The Action of Siderophores Isolated from *Gloephyllum trabum* on the Structure and Crystallinity of Cellulose Compounds." *Int'l. Res. Group Wood Preservation Series,* Stockholm, Sweden. Doc. IRG/WP _ (1991).
Jellison et al. *Appl. Micro. and Biotech.* 35:805–809 (1991).
Jellison et al. "Fungal Siderophores and Their Roles in Wood Biodegredation." *Int'l. Res. Group Wood Preservation Series,* Stockholm, Sweden. Doc. IRG/WP _ (1990).
Kirk et al. *Holzforschung* 45:239–244 (1991).
Lu, J. et al. *Int'l . Res. Group Wood Preservation Series,* Stockholm, Sweden. Doc. IRG/WP 94–10086 (1994).
Lu, J. "The Role of the High Affinity Iron Chelators Isolated from Wood Decay Fungus *Gloeophyllum trabeum* in One Electron Oxidation Reactions and in Hydroxyl Radical Production." Master's thesis. (University of Maine, Orono, Maine, 1994).
Sedlak and Hoigné. *Atmospheric Environment.* 27A:2173–2185 (1993).
Shimada et al. *5th International Conference on Biotechnology in the Pulp and Paper Industry,* Kyoto, Japan. pp. 273–278 (1992).
Sulzberger and Laubsher. *Marine Chem.* 50:103–115 (1995).
Tuor et al. *J. Biotech.* 41:1–17 (1995).
Word. *FEMS Microbiol. Rev.* 13:313–320 (1994).
Zepp et al. *Environ. Sci. Technol.* 26:313–319 (1992).

*Primary Examiner*—Richard D. Lovering
*Attorney, Agent, or Firm*—Townsend and Townsend and Crew LLP

[57] ABSTRACT

A method of forming reactive oxygen species by solubilizing a metal ion from a metal oxy(hydr)oxide compound with an iron oxy(hydr)oxide solubilizing chelator to yield a first soluble metal ion chelate complex. The metal ion is transferred from the chelate complex to a free redox cycling chelator to form a second metal ion chelate complex which reduces the metal ion to a reduced metal species. The reduced metal species is reacted with an oxygen containing oxidant to yield a free redox cycling chelator and a reactive oxygen species. The reactive oxygen species may be used to oxidize a target substrate. The preferred metal ion is a cationic transition metal, such as iron or manganese. A preferred iron oxy(hydr)oxide solubilizing chelator is oxalic acid. The method is generally performed at acidic pH. Also provided is a method of protecting an organic composition from reactive oxygen species comprising impregnating the composition with a redox cycling chelator able to form a reduced metal ion chelate complex with a metal ion, the chelator present in an amount sufficient to protect the composition from degradation from reactive oxygen species such as hydroxyl radical or superoxide anion.

27 Claims, 1 Drawing Sheet

HYDROXYPHENYLACETIC ACID DERIVATIVES

HYDROXYBENZOIC ACID DERIVATIVES

DIHYDROXYPHENYLPENTANE-1,4-DIOL

HYDROXYBENZENE DERIVATIVES

DEGRADATION AND PROTECTION OF ORGANIC COMPOUNDS MEDIATED BY LOW MOLECULAR WEIGHT CHELATORS

This case claims benefit of Provisional application Ser. No. 60/015,353 filed Apr. 12, 1996.

BACKGROUND OF THE INVENTION

Removal of toxic materials from soil and water and the remediation of industrial effluents is a matter of significant economic and environmental concern. Accordingly, significant effort has been expended to develop remediation and detoxification technologies. Likewise, methods to reduce the level of contaminants resulting from industrial chemical processes are being sought. One powerful approach has focused on the use of free-radicals. Free-radicals are typically highly energetic and unstable, and can effect the oxidation or reduction of a broad spectrum of compounds.

The generation of free-radicals by biological systems is known. Research by Koenigs on the action of "Fenton" reagents against cellulose and wood cell wall components suggested that iron and hydrogen peroxide were involved in the production of highly reactive hydroxyl radicals which could initiate the depolymerization of cellulose in wood as: $Fe^{2+}+H_2O_2 \rightarrow Fe^{3+}+HO^{\cdot}+HO^-$. "Hydrogen peroxide and iron: a microbial cellulolytic system?" in *Cellulose as a Chemical and Energy Resource, Symposium 5, Biotechnology and Bioengineering*. Wilke, C. R. (Ed.), John Wiley and Sons, New York 5:151–159 (1975). Hydroxyl radicals can also be generated in the presence of metals by the related Haber-Weiss reaction (Haber and Weiss, *Proc. R. Soc.*, 147:332–351 (1934)) as: $O_2^-+H_2O_2 \rightarrow O_2+HO^-+HO^{\cdot}$. This reaction is now known to occur via the superoxide reduction of iron with hydrogen peroxide oxidation of iron to produce hydroxyl radicals.

Oxalate has been postulated to play a role in direct acid attack upon the wood cellulose and hemicellulose (Shimada et al., *5th Int'l Conf. Biotechn. in the Pulp and Paper Industry*, Kyoto, Japan, 273–278 (1992); Green et al., *Mater. Org.*, 26:191–213 (1991)). It has also been suggested that oxalate may function to reduce iron III to iron II which then reacts with $H_2O_2$ to yield OH. However, Hyde and Wood, Int'l Res. Group Wood Preservation Series, Stockholm, Sweden, Doc. IRG/WP 95-10104 (1995) and others (Sulzberger and Laubsher, *Marine Chem.*, 50:103–115 (1995); Sedlak and Hoigné, *Atmospheric Environment*, 27A:2173–2185 (1993); and Zepp et al., *Environ. Sci. Technol.* 26:313–319 (1992)) have observed that oxalate does not reduce ferric iron except as a light-dependent reaction. Therefore, oxalate cannot function as a direct catalyst of Fenton type chemical reactions in wood.

Wood, *FEMS Microbiol. Rev.* 13:313–320 (1994) has also investigated pathways for Fenton reagent production in fungi, and Hyde and Wood (Int'l Res. Group Wood Preservation Series, Stockholm, Sweden, Doc. IRG/WP 95-10104 (1995)) have also recently proposed a mechanism for brown rot degradation based on Fenton chemistry and the enzymatic generation of iron species. In their model, a pH dependent autoxidation of FeII is postulated to produce hydrogen peroxide at a distance from the hyphae to initiate Fenton reactions leading to the formation of hydroxyl radicals. However, in the absence of other Fenton chemistry reactants or reactive oxygen species, FeII would not be expected to promote an oxidative degradation of cellulosic compounds found in wood. Kirk et al., *Holzforschunq* 45, 239–244 (1991). Although other mechanisms for the production of hydrogen peroxide from an oxalic acid oxidase have also been suggested in brown rot fungi (Espejo and Agosin, *Appln. Environ. Microbiol.*, 57:1980–1986 (1991), a mechanism which would adequately explain a site specific reaction of free FeII and hydrogen peroxide within the wood cell wall has not been put forward.

In studies of wood degrading fungi previous researchers have found that through enzymatic action, cation radicals are produced which are responsible for the degradation of various components of the wood cell wall. Backa et al., *Holzforschung* 46, 61–67 (1992); Barr et al., *Arch. Biochem. Biophys.* 289:480–485 (1992); and Illman et al., Intl. Res. Group on Wood Preservation, Stockholm, Sweden, Doc. No. IRG/WP/1360 (1988). The pathways for this action, particularly in white rot fungi, have been reviewed by various researchers. Higuchi, T., *Wood Sci. and Tech.* 24:23–63 (1990) and Tuor et al., *J. Biotech.* 41:1–17 (1995). Ultimately, however, laboratory duplication of the action of brown and white rot decay fungi via enzymatic action alone has been difficult to achieve. In part this is due to the ephemeral nature of many degradative enzymes from these organisms outside of the immediate extracellular environment of the fungal hyphae.

Brown rot fungi, such as *Gloeophyllum trabeum*, have been found to secrete extracellular low molecular weight iron binding chelators. Jellison, et al., *Appln. Micro. and Biotech.*, 35:805–809 (1991). It has been demonstrated that these chelators have strong reductive capacity, and can readily reduce the redox potential of FeIII/FeII allowing the chelated iron to be more available for reactions with hydrogen peroxide or other oxidants to produce hydroxyl radicals. Lu, Master of Forestry Thesis, University of Maine, Orono, Me., (August 1994). However, a reasonable explanation for the highly efficient and site-specific oxidation of wood cells by fungi such as *G. trabeum* has not been put forward.

What is needed in the art is a non-enzymatic means to generate high levels of free-radicals. Further, what is needed is an inexpensive, uncomplicated, low molecular weight redox generating system for penetration into a variety of contaminated matrices. Conversely, a means to protect substrates from biological or non-biological degradation involving free-radical mechanisms is also needed. Quite surprisingly, the present invention provides these and other advantages.

SUMMARY OF THE INVENTION

The present invention is directed to the use of redox cycling chelators for efficient generation of free-radicals. Alternatively, redox cycling chelators may be employed as scavengers of electrons.

In one aspect of the invention, a method of oxidizing a target substrate is provided. The method comprises solubilizing a metal ion from a metal oxy(hydr)oxide compound. The metal ion is preferably a cation, most preferably a cationic transition metal such as Fe(III). Solubilization is effected using an iron oxy(hydr)oxide solubilizing chelator to yield a first soluble metal ion chelate complex. Preferred iron oxy(hydr)oxide solubilizing chelators include oxalic acid, phosphoric acid, phosphonic acid, or conjugate bases thereof. Preferably, chelation of the metal ion with the metal oxy(hydr)oxide solubilizing chelator is in an acidic medium.

The metal ion is subsequently transferred from the chelate complex to a free redox cycling chelator to form a second metal ion chelate complex which reduces the metal ion to a reduced metal species. Free redox cycling chelators include hydroquinone, EDTA, catechol, quinoline, or substituted derivatives thereof. Preferably, the redox cycling chelator is a catecholate such as 2,3-dihydroxybenzene, a quinoline. Although free redox cycling chelators may be derived from Gloeophyllum spp. or an undefined fraction of media in which Gloeophyllum spp. are cultured, such sources are not as convenient as commercially available free redox cycling chelators.

The reduced metal species is reacted with an oxygen containing oxidant to yield a reactive oxygen species and a free redox cycling chelator. Oxygen containing oxidants include hydrogen peroxide, hydroperoxide, peroxide, singlet oxygen, ozone, and permanganate. In a particularly preferred embodiment, the free redox cycling chelator is again reacted with a metal ion to provide cycling of the reaction.

The reactive oxygen species are then contacted with a target substrate to oxidize the substrate. Target substrates include xenobiotics such as polyphenolics, chlorinated hydrocarbons, polysaccharides, and pesticides, as well as wood pulp, or lignin. Preferred chlorinated hydrocarbons include pentachlorophenol, trichlorophenol, carbon tetrachloride, or trichloroethylene. Generally, the target substrate is oxidized in an aerated environment. It is preferred that the target substrate not be dimethylsulfoxide, a predetermined or premeasured amount of dimethylsulfoxide, or dimethyl sulfoxide in combination with an exogenous dye. It is further preferred that the processes of this invention not include an exogenously added dye which is reactive with the products, or byproducts, of the reaction such as fast yellow/ GC salt or of that type of colorimetric indicator.

In another aspect of the present invention, a method of forming reactive oxygen species is provided. The method comprises solubilizing a metal ion from a metal oxy(hydr) oxide compound with an iron oxy(hydr)oxide solubilizing chelator to yield a first soluble metal ion chelate complex. The metal ion is transferred from the chelate complex to a free redox cycling chelator to form a second metal ion chelate complex which reduces the metal ion to a reduced metal species. In turn, the reduced metal species is reacted with an oxygen containing oxidant to yield a free redox cycling chelator and a reactive oxygen species.

In a further aspect of the present invention, a method is provided for forming reactive oxygen species by contacting a reduced metal species with an oxygen containing oxidant. The method comprises reacting a free redox cycling chelator with a molar excess of oxidized metal species to yield a reduced metal ion chelate complex. The reduced metal ion chelate complex is reacted with an oxygen containing oxidant to yield a free redox cycling chelator, reactive oxygen species and an oxidized metal species, and, the free redox cycling chelator is again reacted with an oxidized metal species.

In yet another aspect of the present invention, a method for protecting organic compositions from degradation from reactive oxygen species is provided. The method comprises impregnating the composition with a redox cycling chelator able to form a reduced metal ion chelate complex with a metal ion, with said chelator present in an amount sufficient to protect the composition from degradation from reactive oxygen species. Generally, the organic composition is wood, paper, pulp, or cellulose. The reactive oxygen species includes superoxide anions, and hydroxyl radicals. Various embodiments of these aspects of the invention are provided by reference to the invention as a whole.

The invention is useful for the remediation of toxic waste sites, the oxidation of substrates in industrial applications such as pulp and/or wood bleaching deinking or delignification, and generating free-radicals for oxidative and reductive industrial applications. The invention may also be utilized to inhibit oxidative degradation of organic compositions.

DESCRIPTION OF THE PREFERRED EMBODIMENT

Figure 1:
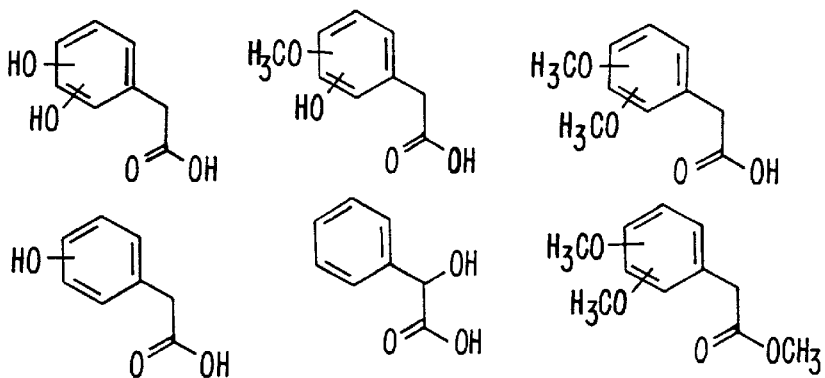
FIG. 1 shows four groups of benzene derivatives identified in the chelator fraction of *Gloeophyllum trabeum*.
Figure 1:
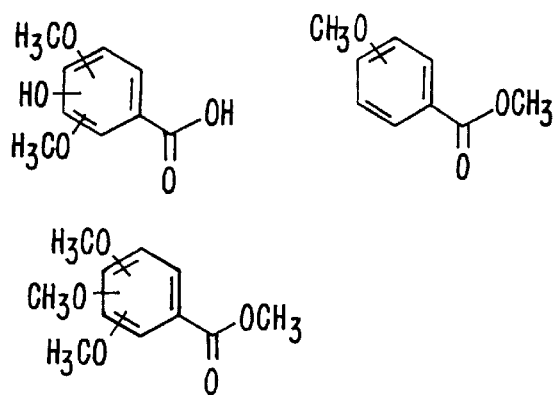
Figure 1:
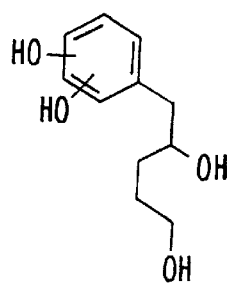
Figure 1:
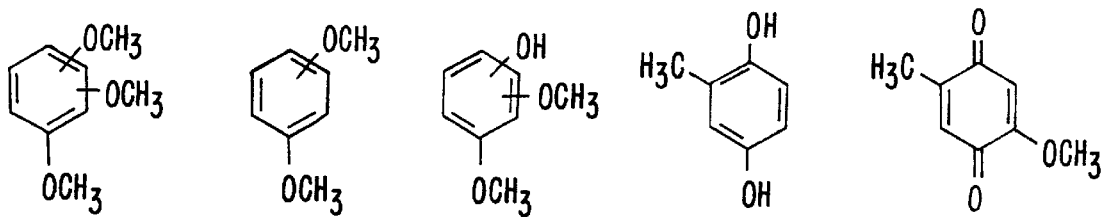

The present invention is directed to a non-enzymatic method of generating reactive oxygen species. The method includes low molecular weight redox cycling chelators which allow highly efficient radical generation via Fenton chemistry. Previously, chelators have been used to bind and remove metals from solution. However, as disclosed herein, it has been discovered that chelators at relatively low concentration may be employed to effect radical generation via redox cycling. The invention also provides for the use of metal solubilizing compounds to increase the concentration of reducible metal ions in solution.

The invention also includes a method of protecting organic compositions from free-radical damage using oxidized redox cycling chelators which are able to form, upon reduction, a reduced metal ion chelate complex. Thus, the redox cycling chelators can function to trap electrons.

The present invention has utility in treating waste, remediating contaminated matrices, oxidative processing in industrial applications such as pulp and paper and in the protection of organic compositions, such as wood, from free-radical damage.

Definitions

As used herein, "chelating" means a reversible reaction of a metallic ion with a molecule or ion to form a complex molecule which does not have all or most of the characteristic of the original metallic ion; pertaining to formation of a molecular structure in which a ring can be formed by the residual valences (unshared electrons) of neighboring atoms.

As used herein, "chlorinated ligand derivative" means any chlorinated phenolic or polyphenolic derivative resulting from wood pulping or bleaching processes including chlorination/extraction sequences. These compounds would be derived from lignin, an amorphous highly-polymerized compound composed primarily of phenyl propane units linked together in three dimensions and would include but not be limited to polychlorinated dioxins and dibenzofurans.

As used herein, "ion" means an electrically charged atom, molecule, or radical.

As used herein, "metal" refers to an element of the periodic table from columns IA (exclusive of Hydrogen), IIA, IB, IIB, IIIB–VIIB, VIII, IIIA (exclusive of Boron), IVA (exclusive of Carbon, Silicon, & Germanium), Antimony, Bismuth, and Polonium. Usually, the metal will be a transition metal (columns IB, and IIIB–VIII) or a post-transition metal (column IIB).

As used herein, "metal ion" refers to an ion of a metal.

As used herein, a "metal ion capable of forming a reduced metal species" means a metal ion which can accept or share an electron. Typically, formation of the reduced metal species diminishes the positive valency of the metal ion.

As used herein, "metal oxy(hydr)oxide" means an oxygen containing form of metal. Typically, a binary compound consisting of a metal and oxygen or metal and hydroxide. A metal oxy(hydr)oxide may be soluble or insoluble in an aqueous solution at pH 7 depending upon the metal.

As used herein, "iron oxy(hydr)oxide solubilizing chelator" refers to a composition capable of chelating a metal or a metal oxy(hydr)oxide and solubilizing the metal in an aqueous solution with a pH between about 2 and 10.

As used herein, "redox cycling chelator" means a composition which is capable of chelating a metal ion and undergoing a redox reaction with the metal ion such that the ion is reduced and the redox chelator is oxidized. A redox cycling chelator can be in a reduced form such that it can reduce a chelated metal ion, or in an oxidized form which may subsequently be reduced for further chelation and redox reaction with a metal ion.

As used herein, "oxygen containing oxidant" refers to an oxygen containing composition which can increase the valence number of an ion or atom as the result of the loss by the ion or atom of one or more electrons thereby making the ion or atom more electropositive.

As used herein, "reactive oxygen species" means a free-radical form of oxygen or oxygen containing compound.

As used herein, "oxidizing" refers to the act of increasing the valency of an ion or atom as a result of the loss of one or more electrons.

As used herein, "target substrate" refers to a composition which is the object of, and capable of being oxidized by, the reactive oxygen species with the proviso that the target substrate not be dimethyl sulfoxide.

As used herein "polyphenolic" refers to an aromatic or polyaromatic compound having at least two hydroxy groups.

As used herein, "chlorinated hydrocarbon" means a compound comprising carbon and chlorine, or carbon, chlorine, and hydrogen. The molecular weight of the chlorinated hydrocarbon typically ranges from about 50 daltons to about 1000 daltons.

As used herein, "polysaccharide" refers to carbohydrates containing at least two molecules of one or more simple sugars.

As used herein, "catechol" refers to any of a number of pyrocatechol derivatives as well as to the isomeric 3,5,7,3', 4'-pentahydroxyflavans, and the general class of flavan-3-ols.

As used herein, "Gloeophyllum spp." means a basidiomycetous fungus capable of producing brown rot in wood which is a member of the genus Gloeophyllum species in Stalpers, J. A., "Identification of wood-inhabiting Aphyllophorales in pure culture" in *Studies in Mycology No. 16*, Institute of the Royal Netherlands Academy of Arts and Sciences. Examples include *G. trabeum* and *G. sepiarium*.

As used herein, "aerated environment" refers to a medium which is in direct contact with the atmosphere or an alternative oxygen source.

As used herein, "molar excess" refers to a quantitatively greater amount with respect to moles of compound.

Oxidizing a Target Substrate
Solubilizing the Metal Ion

In one aspect, the invention is directed to a method of oxidizing a target substrate. Any compound, in which covalent bonds are made or broken or from which electrons are abstracted by the oxidizing method disclosed herein, may be a target substrate. The target substrate may be a phenolic or polyphenolic (collectively "polyphenolics"), polysaccharide, wood pulp or other components of wood (e.g., lignin, cellulose, hemicellulose), or any number of pesticides as disclosed in U.S. Pat. No. 5,232,484, incorporated herein by reference. Further, the target substrate may be a halogenated compound which is susceptible to oxidative dehalogenation. Such halogenated compounds include chlorinated hydrocarbons such as pentachlorophenol, trichlorophenol, carbon tetrachloride, or trichloroethylene. The target substrate may also be any compound in which oxidation of a double or triple bond is required such as alkenes, arenes, cycloalkenes, alkynes, or various derivatives thereof.

The method comprises solubilizing a metal ion from a metal oxy(hydr)oxide compound with an iron oxy(hydr)oxide solubilizing chelator. Solubilization may occur in any number of aqueous matrices such as a liquid, slurry, or suspension. As will be clear to the skilled artisan, metal oxy(hydr)oxide compounds include such ubiquitous compounds as $Fe_2O_3(H_2O)_x$, and $Fe_2(OH)_3$. Wu and Luther III, *Marine Chemistry*, 50:159–177 (1995); Sulzberger and Laubsher, *Marine Chem.*, 50:103–115 (1995). Solubilization preferably occurs between about pH 0 and pH 9, more preferably between about pH 2 and pH 7, and most preferably between about pH 3.6 and less than pH 7. The temperature may be varied so as to control the rate of solubilization but typically occurs between greater than 0° C. and less than 100° C., more typically between about 5° C. and 50° C.

The iron oxy(hydr)oxide solubilizing chelator will have the capacity to act as a phase transition agent and solubilize otherwise precipitated or suspended metal oxy(hydr)oxide compounds. Those of skill will recognize that oxygenated forms of iron lend a yellow to orange tint to an aqueous solution. The oxy(hydr)oxide solubilizing chelator employed will have the capacity to solubilize and clarify an aqueous solution of oxygenated iron as measured spectrophotometrically. For example, if a saturated iron oxy(hydr)oxide solution of pH 4.0 at room temperature is incubated with the Fe(II) indicator ferrozine, a redox cycling chelator such as 2,3-dihydroxybenzoic acid, and the oxy(hydro)oxide solubilizing chelator, then an increase in absorbance of the solution at 562 nm will occur over time as compared to a control solution lacking the solubilizing chelator. The increased absorbance is due to the specific reaction of Fe(II) with ferrozine and thus is an indirect means of determining the solubilizing capability of an iron oxy(hydr)oxide solubilizing chelator. Typically, sufficient iron oxy(hydr)oxide solubilizing chelator will be present in the solution to yield an increase in absorbance of at least 25%, more preferably at least 50% relative to a control lacking an iron oxy(hydr)oxide solubilizing chelator. For example, metal oxy(hydr)oxide compounds may be solubilized by the addition of a 1:1 ratio of iron oxy(hydr)oxide solubilizing chelator to metal oxy(hydr)oxide compound.

Iron oxy(hydr)oxide solubilizing chelators include oxalic acid, phosphonic acid, phosphoric acid, ascorbic acid, citric acid, or conjugate bases thereof. The iron oxy(hydr)oxide solubilizing chelator may be obtained, for example, from white rot fungi or brown rot fungi such as the genus Gloeophyllum including *Gloeophyllum trabeum* and *Gloeophyllum sepiarium*.

Metal ions solubilized from the metal oxy(hydr)oxide compound are preferably transition metal ions, most preferably iron or manganese ions. The metal ions are preferably cationic, with oxidation states typically at +2 to +4. The amount of metal available for the subject method may be controlled by addition of exogenous metal or chelation using a non-redox cycling chelator. Solubilization of the metal ion from a metal oxy(hydr)oxide compound with a iron oxy (hydr)oxide solubilizing chelator yields a first soluble metal ion chelate complex.

Transferring the Metal Ion

The metal ion of the first soluble metal ion chelate complex is transferred to a free redox cycling chelator via direct contact between the first soluble metal ion chelate complex and free redox cycling chelator. The free redox cycling chelator should have sufficient affinity with the metal ion to bind the metal ion and form a second metal ion chelate complex. The relative affinity of the redox cycling chelator for the metal versus that of the iron oxy(hydr)oxide solubilizing chelator for the same metal can be indirectly determined by the ability of the redox cycling chelator to sequester metal from the first soluble metal ion chelate complex and subsequent reduction of that metal ion. Controls may include the redox cycling chelator and metal ion in the absence of the first metal ion chelator. Reduction of iron from the ferric to ferrous valence state may be determined colorometrically using a ferrozine reagent by the methods of Stookey, *Anal. Chem.*, 42:779–782 (1970); Gibbs, *Anal. Chem.* 48:1197–1201 (1976); or Sorenson et al., *Appl. Environ. Microbiol.* 43:319–324 (1982). The free redox cycling chelator's affinity can also be determined by a statistically significant increase in free-radical generation by the instant method measured relative to a control method in which the iron oxy(hydr)oxide solubilizing chelator is absent. Generally, the increase in free-radical generation will be at least 2-fold higher, more preferably at least 3, 4, or 5-fold higher than the control.

Chelators are well known in the art (Howard, W. L. and D. A. Wilson. (1993) "Chelating agents" in J. I. Kroschwitz and M. Howe-Grant (Eds.) Kirk-Othmer. *Encyclopedia of Chemical Technology Vol 5*, 4th edition John Wiley and Sons, pp. 764–795, incorporated herein by reference) and high-affinity chelators can be readily assessed by testing for a positive reaction in the chrome azural S (CAS) universal assay (Schwyn and Neilands, *Anal. Biochem.*, 160:47–56 (1987)) and for reduction of metals through reductive/oxidative cycling reactions. This later type of reaction can be tested for by using freshly prepared ferric iron, ferrozine (a ferrous iron chelator), and the redox cycling chelator to be tested. All components of the reaction are mixed in an oxygenated environment in buffered solutions representative of the pH spectrum. When ferric iron in the reaction mixtures is added at a range of concentrations increasing from a 1:1 molar ratio with a redox cycling chelator and the reaction is followed over time at A=562 nm, the solutions containing excess iron will display reaction curves with increasing absorbance until the reaction equilibrium has been reached. This is a result of the redox cycling action causing greater than 1:1 molar ratio of iron to be reduced, and the reduced iron reaction with the ferrozine chelator. Appropriate ferrozine/iron controls without redox cycling chelators in the reaction mixture should be used and any control baseline absorbance subtracted from the redox cycling chelator containing samples until all iron in the redox cycling chelator reaction mixtures is reacted with the ferrozine. Similar reactions known to those skilled in the art may be used to test the redox cycling capability of chelators with other metal species. Structural features which provide for reversible oxidation-reduction reactions are well known to those of skill and may aid in assessing which chelators may function as redox cycling chelators.

Redox cycling chelators include flavonoids which refers to several classes of compounds having a common structural feature in that a $C_6C_3C_6$ carbon skeleton is present. The term flavonoid is used to designate the group of substances which include chalcones, flavones, flavonols, isoflavones, anthocyanidins, flavans, and derivatives. Chalcones are unsaturated ketones which undergo ring closure with an o-hydroxyl group to form flavanones or anthocyanidins depending on which ring contains the hydroxyl. Representative flavonoids include chrysin, morin, fisetin, robinetin, quercetin, kaempferol, pinocembrin, 3-hydroxydihydrochrysin, naringenin, taxifolin, aromadendrin, dihydromorin, and dihydrobinetin. See, Buchanon, M. A., "Extraneous components of wood" in B. L. Browning (Ed.) *The Chemistry of Wood,* Robert E. Krieger Publishing Co. Huntington, N.Y. (1975), incorporated herein by reference. Redox cycling chelators also include quinone, EDTA, catechol, quinoline (e.g., 8-hydroxy quinoline), hydroxyquinoline, dihydroxybenzene, trihydroxybenzene, dihydroxybenzoic acid (e.g., 3,4-dihydroxybenzoic acid), or substitututed derivatives thereof. Preferably, the redox cycling chelator will be obtained from Postia spp. (e.g., *P. placenta*) or Gloeophyllum spp. in substantially purified form and will include hydroxyphenylacetic acid derivatives, hydroxybenzoic acid derivatives, dihydroxyphenylpentane-1,4-diol derivatives, and hydroxybenzene derivatives. Preferably, the redox cycling chelators have a molecular weight of less than about 2000 daltons, preferably less than 1000. Low-molecular weight redox cycling chelators are able to penetrate into microvoid spaces and may effect more efficient oxidation of target substrates. The redox cycling chelators may be bound to a solid support by linking technology well known to those of skill. The redox cycling chelator is typically at a ratio of 1:5–1:100 with the solubilized metal.

Transferring the metal ion from the first soluble metal ion chelate complex to a free redox cycling chelator in its reduced form results in formation of a second metal ion chelate complex which reduces the metal ion to a reduced metal species. The reduced metal species is then able to react with an oxygen containing oxidant.

Reacting with an Oxidant and Oxidizing the Target Substrate

The reduced metal species reacts by way of direct contact with an oxygen containing oxidant to yield a reactive oxygen species and an oxidized free redox cycling chelator. The reaction is not limited to a particular mechanism and embraces both reaction by the reduced metal ion while complexed with the chelate and/or by a reduced metal ion dissociated from the complex. Oxygen containing oxidants include hydrogen peroxide, hydroperoxides, peroxides, ozone, singlet oxygen, or permanganate. Those of skill will recognize that the organic groups of hydroperoxides and peroxides may be altered to provide the desired physicochemical properties. Preferably, reaction with an oxygen containing oxidant occurs in an aerated environment, such as the Earth's atmosphere. The concentration of oxygen in the environment may be adjusted to control the production of free-radicals.

The reactive oxygen species generated include a variety of free-radical compounds such as superoxide anion or hydroxyl radicals. These reactive species are subsequently contacted with a target substrate to effect oxidation of the target to the desired degree. Thus, target substrates may be oxidized to the point of mineralization (i.e., degraded to its constituent elements). Oxidized free redox cycling chelator may be reduced by processes inherent in the environment to "cycle" in subsequent reactions with a first soluble metal ion chelate complex. For example, and without being bound by theory, the iron oxy(hydr)oxide solubilizing chelator oxalate may be oxidized in the process of transferring the metal ion to the free redox cycling chelator, as occurs in the photo-oxidation of oxalate with concurrent reduction of iron. Sulzberger and Laubscher (1995). The resulting $CO_2^-$ would function as a reductant for oxygen or potentially with oxidized forms of the redox cycling chelator to promote cycling reactions.

Any one of the disclosed elements of the instant method may be endogenous to the system upon which the subject method is performed or may be added to the matrix to which the method is being applied. Thus, for example, a metal ion, metal oxy(hydr)oxide compound, iron oxy(hydr)oxide solubilizing chelator, first soluble metal ion chelate complex, free redox cycling chelator, second metal ion chelate complex, or oxygen containing oxidant may be a natural constituent of the matrix (e.g., iron present in contaminated soil) or provided, in whole or part, exogenously. Exogenous elements may be provided in a native form (e.g., whole *Gloeophyllum trabeum* organisms), or enriched relative to their native source (e.g., a redox cycling chelator fraction from a Gloeophyllum spp. or Postia spp. extract). The elements may be a biologically foreign compound (i.e., a xenobiotic), biological compounds synthesized or obtained from an ex vivo source (i.e., synthetic natural compounds), non-biological compounds (i.e., synthetic artificial compounds), or merely obtained from a non-fungal source. Thus, for example, the redox cycling chelator may be non-fungally derived, a compound indigenous to biological systems but synthesized ex vivo, or a non-biological synthetic compound. The embodiments used in this or other aspects of the invention may be adopted in whole or part for use in any or all aspects of the invention.

Forming Reactive Oxygen Species I

In another aspect, the present invention is directed to forming reactive oxygen species by methods and embodiments previously disclosed. The reactive oxygen species may be used, for example, in industrial applications where free-radical production is required. Those of skill recognize that reactive oxygen species, such as superoxide anion, are potent reducing agents. Thus, formation of the reactive oxygen species may be used to effect an oxidation or reduction.

Forming Reactive Oxygen Species II

The present invention also includes a method of forming reactive oxygen species, comprising reacting a free redox chelator with a molar excess of oxidized metal species to yield a reduced metal ion chelate complex. The oxidized metal species will be in an unoxygenated form in an oxidized to cationic state. For example, free Fe(III) may be used in reaction with the free redox chelator. A reduced free redox cycling chelator will yield upon reaction with an oxidized metal species the reduced metal ion chelate complex. The reduced metal ion chelate complex is reacted with an oxygen containing oxidant to yield reactive oxygen species, an oxidized metal species, and free redox cycling chelator. The free redox cycling chelator is then reduced and regenerated by processes inherent in the aqueous media and is reacted with an oxidized metal species to form the cycling reaction.

Protection of Organic Compositions

In an additional aspect, the present invention provides a method for protecting organic compositions from degradation from reactive oxygen species. The organic compositions include plant, animal, fungal, or bacterial compositions. Preferably, the organic compositions are plant materials susceptible to oxidation or reduction by free-radicals such as wood, paper, pulp, or cellulose.

The method comprises impregnating the organic composition with a redox cycling chelator. Impregnating may be accomplished by a variety of methods including, but not limited to, coating, spraying, admixing, injecting, or saturating. Impregnating may be accomplished under various combinations of pressure, vacuum, and temperature. Thus, the surface and/or interstitial spaces of the organic composition may be impregnated with a redox cycling chelator. The redox cycling chelator will be in an oxidized form such that upon reduction it is able to form a reduced metal ion chelate complex. The redox cycling chelator is able to trap electrons and thus acts to scavenge free-radicals thereby lessening oxidative or reductive reactions with the organic composition. Accordingly, the organic composition will be impregnated with sufficient quantity of redox cycling chelator such that a quantitative or qualitative assessment of the organic composition indicates a reduction in the extent of degraded (oxidized or reduced) organic composition relative to an untreated control. Such degradation may be assessed by measurement of, for example, depolymerized cellulose or other breakdown products, or more commonly by weight loss of the substrate such as, for example, outlined in standard ASTM D1413. Anon. 1995. Standard method for wood preservatives by laboratory soil-block cultures. Standard D 1413-76 (Reapproved 1994). In: *Annual Book of ASTM Standards*. Section 4, Volume 04.10 Wood. American Society for Testing and Materials. 1916 Race St. Philadelphia, Pa., USA. 642 pp, incorporated herein by reference.

Although the present invention has been described in some detail by way of illustration and example for purposes of clarity of understanding, it will be obvious that certain changes and modifications may be practiced within the scope of the appended claims.

EXAMPLE I

Example I describes the isolation of naturally occurring redox cycling chelators.

The presence of chelators was demonstrated by a modified chrome azural S (CAS) assay (Schwyn and Neilands, *Anal. Biochem.*, 160:47–56 (1987)), a standardized test for ferric chelation activity, and was confirmed by paper electrophoresis. Ten fungi from both brown and white rot groups, including *G. trabeum*, were demonstrated to be CAS positive in this work.

Benzene derivative chelators were first isolated from *G. trabeum* (Jellison, et al., *Appl. Micro. and Biotech.*, 35:805–809 (1991)) and can be partially purified via a standardized procedure for the isolation of ferric catecholate siderophore compounds from culture filtrates. The fungus was grown in a basal salts medium (Highley, T. L., *Wood Fiber* 5:50–58 (1973)) with reduced iron concentration, and microcrystalline cellulose and/or glucose as the only carbon source. Benzene derivative chelators were then extracted from the spent growth medium of *G. trabeum* using a procedure which included a 1000 dalton ultrafiltration step to exclude higher molecular weight compounds, and media acidification followed by ethyl acetate extraction to isolate benzene derivatives. The resultant partially purified fraction possessed high CAS activity. Chelators were identified as catechol derivatives using Arnow, *J. Bio. Chem.*, 118:531–537 (1937) and Rioux assays (Ishimaru and Loper, *Iron Chelation in Plants and Soil Microorganisms*, Barton and Hemming (eds.), Academic Press, 27–73 (1993), Easwaren, Master of Science thesis, University of Maine, Orono, Me., (December, 1994). Detailed procedures for chelator isolation are presented in Jellison, et al., *Appl. Micro. and Biotech.*, 35:805–809 (1991) and Chandhoke, *FEMS Microbiol. Letters*, 90:236–266 (1992). CAS tests on degraded wood also demonstrated the presence of chelator activity. For convenience the chelators and catechol derivative compounds isolated from G. trabeum are referred to as Gt chelators.

EXAMPLE II

Example II describes the characterization of microbially isolated redox cycling chelators.

The Arnow (1937) assay for the detection of catechol siderophores was used as a measure of Gt chelator concentration. Dihydroxybenzoic acid was used to develop a standard curve for comparative purposes as described by Ishimaru and Loper (1993).

Partially purified fractions of Gt chelator described in the previous example were analyzed using a HPLC/GC equipped with a MS (Hewlett Packard MS 5989A) quadrupole detector. The sample was also methylated before analysis using $CH_2N_2$ (diazomethane) and analyzed again using GC/MS (Paszczynski et al., in progress). Diazomethane was freshly prepared using a diazald (N-methyl-N-nitroso-p-toluenesulfonate) reagent. A yellow solution of $CH_2N_2$ gas in carbitol was obtained using the method of de Boer and Backer, Diazomethane, 250–253, Rabjohn (ed.), Organic Synthesis, John Wiley and Sons, New York. (1963). The solution was stored in darkness at −20° C. Purified samples of Gt chelator were dried under nitrogen and derivatized. During solubilization, the evolution of gas was observed for about one hour (Black, Aldrichimica Acta, 16:3–10 (1983)). Methylation increases the volatility of compounds and decreases their reactivity, thus helping in GC/MS analysis. A 2-μl sample was injected to a gas chromatograph equipped with a capillary-fused silica DB-XLB column (30 m×0.25 mm, 0.5-μm film thickness; J & W Scientific, Folsom, Calif.). The MS interface temperature was set at 280° C. The detector operated in electron ionization mode: repeller, 7 V; emission, 300 V; electron energy 70 eV; source temperature was adjusted at 250° C. Perfluorotributyl amine was used for calibration and tuning of the MS engine. The products were identified by comparing their retention times and mass spectral fragmentation patterns with those of standard compounds and/or spectra stored in the Wiley or NST data bases.

HPLC analyses were performed using a 1050 (Hewlett Packard) liquid chromatography system equipped with a C18 reverse phase microbore column (Phenomenex 25×0.2 cm). The sample was delivered to the particle beam interface using an acetonitrile/water solvent gradient at a flow rate of 0.3 ml per minute. The particle beam vacuum desolvation interface temperature was 75° C. The MS detector was calibrated and run at similar conditions to the GC analysis.

Four groups of benzene derivatives were identified in the analyses (FIG. 1). We have previously reported finding dihydroxy benzene derivatives as components of the Gt chelator partially purified fraction (Easwaren, Master of Science thesis. University of Maine, Orono, Me. (December, 1994) and Jellison et al., Int'l Res. Group on Wood Preservation Series, Stockholm, Sweden, Document IRG/WP 1479 (1991b). Because these compounds will undergo oxidation to form semiquinones and quinones, these later compounds would also be expected to be found in the samples analyzed. Chelators that have previously been isolated from fungi have not been phenolate (i.e., benzene derivatives) in character (Winkelmann and Winge, Metal Ions in Fungi, Marcel Dekker, Inc. NY, pg. 507 (1994)). To our knowledge, although benzene derivative chelators are often produced by bacteria, the G. trabeum chelators are the first benzene derivative high-affinity metal chelators to be reported from fungi.

Phenolic compounds from plants are known to undergo oxidation to produce quinones, condensed tannins and other oxidized phenolic derivatives (Pueyo and Ariza, Role of reactive oxygen species in the mutagenicity of complex mixtures of plant origin. Halliwell and Aruoma (Eds.), DNA and Free Radicals. Ellis Horwood Ltd, West Sussex, England Simon and Schuster. pp. 275–291 (1993)). It has also been shown that allowing phenolic compounds to oxidize naturally over a period of time promotes the production of hydrogen peroxide from the autoxidation of the phenolics. The amount, as well as the degree of oxidation has been suggested to affect the mutagenic potential of these phenolic compounds, which was also directly related to the amount of hydrogen peroxide produced by autoxidation of the phenolics. It is likely that at least some of the benzene derivatives produced by G. trabeum would undergo autoxidation similarly to that of other catechols, hydroquinones and other phenolics from plant materials (Leanderson and Tagesson, Mineral fibers, cigarette smoke, and oxidative DNA damage, Halliwell and Aruoma (Eds.), DNA and Free Radicals. Ellis Horwood Ltd, West Sussex, England Simon and Schuster. pp. 293–314 (1993)). A large number of reactive oxidized benzene derivatives could therefore be produced from the parent compounds produced by the fungus resulting in the large number of compounds observed in our analyses.

EXAMPLE III

Example III describes the reduction of ferric iron.
Involvement of Molecular Oxygen One-electron oxidants, such as ferric iron species, react with catecholate derivatives through a two-step mechanism with intermediate formation of a semiquinone radical (Mentasti et al. Electron-transfer reactions of benzene-1,2-diols with hexachloroiridate-(IV) in acidic perchlorate media. J. C. S. Dalton 24, 132–135 (1977)). This radical is stabilized through its resonance structures and can react with molecular oxygen to form a peroxide radical as an active oxygen radical species. When 2,3,-dihydroxybenzoic acid (DHBA) is oxidized by Fe III species, the initial step in the reaction involves the formation of a DHBA-iron complex. The complex is subsequently oxidized by additional Fe III to form the semiquinone intermediate with the concurrent reduction of the iron as shown in Scheme I after Xu and Jordan, Inorg. Chem., 27:4563–4566 (1988). The formation of the of the initial DHBA-iron complex likely alters the electron density distribution increasing the probability that the semiquinone can form by one electron oxidation with iron. The semiquinone structure is then capable of reacting with oxygen to produce superoxide and the quinone species. Many of the compounds isolated from the Gt chelator mixture are hydroxylated or methoxylated benzene derivatives that could be expected to react with iron in a similar manner to DHBA. The Gt chelator gives a strong response in the Arnow assay for catecholate compounds.

Redox Potential

Ethylenediaminetetra-acetic acid (EDTA) as a metal chelating compound has been studied extensively (Halliwell and Gutteridge, Methods Enzymol., 186:1–85 (1990)). It has been shown that, when iron as an iron-EDTA complex is added to hydrogen peroxide, hydroxyl radicals are formed (Florence, J. Inorg. Biochem., 22:221–230 (1984)). EDTA accelerates the iron-dependent formation of hydroxyl radicals by lowering the redox potential of Fe3+/Fe2+ by 0.65V, thus making the reaction of iron and hydrogen peroxide, with the formation of hydroxyl radicals, thermodynamically possible (Sutton and Winterbourn, Oxygen Radical in Chem-

*istry and Biology*, p. 177–183. Bors et al. (ed.) Walter de Gruyter, Berlin. (1984)). Preliminary electrochemical studies in our laboratories have shown that the Gt chelator also reduces the redox potential of the iron couple. It has also been shown in other experiments that the Gt chelator alters the redox potential of iron to favor its reaction with other potential reactants. This is demonstrated by monitoring the reduction of ferric iron in the presence of ferrozine, an FeII chelator used in the detection of reduced iron ((Stookey, *Anal. Chem.*, 42:779–782 (1970); Gibbs, *Anal. Chem.* 48:1197–1201 (1976); and Sorenson et al., *Appl. Environ. Microbiol.* 43:319–324 (1982)). In a typical assay freshly prepared ferric iron (anhydrous $Fe_2Cl_3$) is mixed in a buffered solution with 2.0 mM ferrozine. An aliquot of Gt chelator is then added to start the reaction. When the Gt chelator is present in excess at pH values below neutrality, all available iron is rapidly reduced and then bound by ferrozine as indicated by an increase in absorbance at 562 nm. Increasing the amount of FeIII in the reaction in the presence of excess chelator increases the rate of reduction of iron in solution. The rate of reaction is increased in acidic pH environments as these environments are more favorable for the reduction of iron. At pH values of 7 and above, the reduction of iron is greatly limited.

Redox Cycling

Ferric chelators by definition have a high affinity for the oxidized valence state of iron but chelators which function to alter the redox potential of the iron couple must also possess a reduced affinity for the ferrous form of iron. Under pH 4.5 buffered conditions, in the presence of excess FeIII, the Gt chelator redox cycles to bind and reduce iron, releasing the ferrous metal to bind with the FeII ferrozine indicator. The Gt chelator undergoes oxidation concurrent with the reduction of iron and, in the presence of excess iron III (or where other metabolites bind or react with reduced iron), the chelator releases the reduced form of iron. The Gt chelator is then reduced enabling it to bind additional ferric iron for repeated reduction. Other phenolic compounds have been reported to be involved in redox cycling with oxygen and these reactions are known to be promoted by the presence of transition metals. Catechol derivative chelators, to our knowledge have not specifically been described in redox cycling processes but we use the term "redox cycling" for the Gt chelators because the mechanism we describe appears to fall within the broad definitions of redox cycling. The reduction of the Gt chelator may occur in the presence of superoxide radicals similarly to that of other semiquinone radicals in redox cycling processes. Butler and Hoey, *DNA and Free Radicals,* Halliwell and Aruoma (Eds.), Ellis Horwood Ltd, West Sussex, England Simon and Schuster. pp. 244–273 (1993).

When the Gt chelator is present at an approximate ratio of one micromole of chelator to 5 micromoles of iron (5.6 $\mu$M of Gt chelator to 30 $\mu$M of FeIII), all iron in solution was reduced after 1 hour. As the amount of chelator was reduced, iron reduction occurred at a slower rate. The data presented here indicate that the fungus has the potential to reduce relatively large amounts of iron in an efficient manner when this metal is available in the environment. Under most conditions appropriate for metabolic functioning of wood degrading fungi, iron and other transition metal availability would be highly limited. Under these conditions, without excess FeIII to drive the redox cycle, reduced forms of iron could potentially remain bound to the chelator to react when an appropriate oxidant (or other reactant) in the environment is encountered and semi-quinone forms of the Gt chelator are oxidized to quinones.

EXAMPLE IV

Example IV describes the effect of pH and oxalic acid on oxidation.

To simulate an environmental situation where iron oxides and hydroxides were present, an aqueous solution of ferric iron was allowed to complex with oxygen over a period of approximately 3 months until an equilibrium between free iron hexahydrate and oxygenated forms (hydroxo species) of the this compound was reached. The resulting solution was yellow-orange in color as opposed to the pale yellow of freshly prepared FeIII chloride solutions of the same metal concentration. The oxygenated form of the iron complex will remain as a colloidal suspension or as an iron hydroxide complex, $Fe_x(OH)_y$ (Wu and Luther III, *Marine Chemistry,* 50:159–177 (1995) and Sulzberger and Laubsher, *Marine Chem.,* 50:103–115 (1995)), in reduced pH environments permitting experimental reactions to be performed. Because oxygenated forms of iron have extremely low solubility, pure iron oxide solutions were not be used in the assays described, and the mixture of iron (hydr)oxides was used for the comparative studies detailed below.

When the Gt chelator is added to buffered solutions of the oxygenated iron mixture without oxalate, only the limited remaining available non-oxygenated iron III in solution is free for chelation. The available iron III is reduced by the Gt chelator and then bound by the ferrozine indicator. Reduction of pH alone, at least within a buffered reaction pH range down to 2.2 (appropriate to that which fungi could reduce the extracellular environment), is not adequate to reduce oxide forms of iron in the environment to solubilize iron for binding and reduction by the Gt chelator. This shows that at pH values above 7, that reduction even of freshly prepared ferric iron by the Gt chelator is limited.

Oxalate is a metabolite known to be produced in copious amounts by many wood degrading fungi (Takao, *Appl. Microbiol.,* 13:732–737 (1965); Bech-Anderson, J., International Research Group on Wood Preservation Series. Stockholm, Sweden. Document 1330, (1987); Green et al., *Mater. u. Org.,* 26:191–213 (1991); Connolly and Jellison, International Working Group on Wood Preservation Series, Stockholm, Sweden, Document IRG/WP/94-10075, (1994); Ritschkoff et al., *J. Biotech.* 40:179–186 (1995); Micales, *Material und Organismen* 28:197–207 (1994)). It has been postulated to have many roles in fungal degradative processes ranging from direct acid hydrolysis of lignocellulosic components (Shimada et al., Int'l Res. Group on Wood Preservation Series, Stockholm, Sweden, Document IRG/WP 1472, (1991); Shimada et al., 5th Int'l Conf. on Biotechnology in the Pulp and Paper Industry, Kyoto, Japan, pp. 273–326 (May 27–30, 1992); Shimada et al., *FEMS Microbiology Reviews,* 13:285 (1994); Green et al., *Mater. u. Org.,* 26:191–213 (1991)) to the maintenance of reduced iron in the environment (Hyde and Wood, Int'l Res. Group Wood Preservation Series, Stockholm, Sweden, Doc. IRG/WP 95-10104 (1995)). When oxalic acid is added to oxygenated iron solutions, in a well documented reaction the oxide form becomes solubilized (as indicated by loss of coloration of the solution) as the iron is bound as iron oxalate (Sulzberger and Laubsher, *Marine Chem.,* 50:103–115 (1995)). Because oxalate is a weak chelator of iron, the Gt chelator would be expected to sequester iron from it with the oxalate functioning as a phase transfer agent. This occurs when the Gt chelator is added to an iron oxalate solution in a pH 4.4 buffered environment. The iron is subsequently reduced in the presence of the Gt chelator, and this can be followed by an increase in absorbance of ferrozine indicator in the reaction mixture. When oxalate is added to oxygenated iron (hydr)oxide mixtures, allowed to react for several hours in the dark, and Gt chelator then added, at pH 4.4 much of the iron in solution is reduced by the Gt chelator. In similar experiments at pH 2.2, iron reduction is greatly limited in the presence of oxalate plus Gt chelator. The mechanism for the pH dependent phase transfer of iron from oxalate to the Gt chelator must still be explored, however, our results indicate that iron (hydr)oxide complexes are not directly available for chelation by the Gt chelator. Oxalate, (or in the fungal environment, perhaps another weak organic chelator capable of solubilizing and reducing iron from oxide forms) is required to provide iron in an available state for subsequent pH-dependent sequestration by the Gt chelator.

The oxalic acid produced by wood degrading fungi undoubtedly functions not only as a chelation agent to sequester iron from iron (hydr)oxide complexes, but also to reduce the pH, thus creating a pH gradient between the immediate fungal environment and the wood cell wall. A pH gradient in the environment surrounding the fungal hyphae of brown rot fungi has previously been proposed (Hyde and Wood, Id.) Wood is highly buffered and the initial pH of many wood species is approximately pH 5 to pH 7. The pH of both brown and white rotted woods, but particularly brown rotted woods, has been shown to decrease over time as degradation proceeds (Jellison et al., Int'l Res. Group on Wood Preservation Series, Stockholm, Sweden, Document IRG/WP 10048-93 (1993) and Jellison et al., Int'l Res. Group on Wood Preservation Series, Stockholm, Sweden, Document IRG/WP 1552 (1992)). Our data suggest that the fungus employs a mechanism to sequester iron from insoluble iron hydr(oxide) forms in the wood lumen region. As the iron-oxalate diffuses outward into the wood cell wall, the buffered, higher pH environment there allows transfer of the iron to the Gt chelator for subsequent reduction. Metal reduction would therefore occur only within the wood cell wall once a pH gradient was established in the environment surrounding the fungal hyphae.

EXAMPLE V

Example V describes hydroxyl radical and superoxide radical production.

Hydroxyl radical production was monitored using dimethyl sulfoxide (DMSO) as a scavenger (Dorfman and Adams 1973). Methanesulphinic acid (MSA) is generated as a product of the reaction and the MSA product was detected by HPLC as outlined by Fukui et al., *J. Chromatography*, 630:187–193 (1993).

In these studies, reactants included iron II and iron III in buffered solutions with hydrogen peroxide and the Gt chelator. The effect of oxalic acid as well as the effect of superoxide dismutase was tested (Lu, Master of Forestry thesis. University of Maine, Orono, Me., (August 1994)). The data show that when the Gt chelator is present in the reaction mixture with either Fe III or Fe II and hydrogen peroxide, that hydroxyl radicals are produced. Very limited hydroxyl radical production occurs with ferric iron and hydrogen peroxide alone in solution. Greater hydroxyl radical production occurs with Fe II initially present in the reaction because this valence state of the metal can react immediately with hydrogen peroxide to produce hydroxyl radicals. The data also show that superoxide dismutase (SOD) reduces the amount of hydroxyl radicals produced when the Gt chelator is present, but has little effect on hydroxyl radical production in the absence of the chelator. Superoxide dismutases are metalloenzymes that catalyze the reaction:

$$O_2^- + O_2^- + 2H^+ \rightarrow H_2O_2 + O_2$$

Superoxide reduction of iron in the presence of redox-active low molecular weight chelators has previously been reported. Chen et al., Oxidative Stress and Antioxidant Defenses in Biology. Chapman and Hall Publishers. pp. 62–95, (1995). The reduction in hydroxyl radicals observed in the presence of SOD is likely to occur because the superoxide radical can function as a metal reductant in cyclic redox processes. Dismutation of the superoxide radical by SOD prevents or limits these reactions. SOD thus can potentially function to prevent or limit the redox cycling of metal chelating hydroxy benzene derivatives such as the Gt chelator. SOD catalyzed dismutation of the superoxide radical produced in the system would therefore account for a reduction in hydroxyl radicals produced in the system.

Addition of oxalate increases the amount of hydroxyl radical production in aerated solutions at pH 4.0 with both Fe III and Fe II, in the presence of the Gt chelator. This occurs because, in the absence of oxalate, insoluble oxygenated species of iron can form as a result of the cycling of iron to the ferric state and subsequent reaction with oxygen to form (hydr)oxide complexes $[Fe_x(OH)_y]$, in the reaction mixture. With oxalate present, in oxygenated solutions ferric iron species are sequestered rather than reacting with oxygen. The presence of oxalate in the reaction mixture sequesters iron as an iron-oxalate complex and this iron is then accessible to the Gt chelator for iron binding, reduction, and subsequent reaction with hydrogen peroxide to form hydroxyl radicals. Oxalate has little effect on the overall reaction rate when freshly prepared iron solutions are maintained in nitrogen environments because iron will not form (hydr)oxide complexes under these conditions. Increased hydroxyl radical production was observed in the presence of oxalate (at a 100 μM concentration) in aerated environments despite reports of oxalate scavenging of hydroxyl radicals proposed in a white rot system (Barr et al., *Arch. Biochem. Biophys.*, 289:480–485 (1992)).

The results indicate that molecular oxygen from the environment is involved in the production of hydroxyl radicals and it is likely, as with other oxygen ligand metal chelators, that oxygen is required in redox cycling reactions. The involvement of molecular oxygen in the oxidation of hydroxy benzene compounds to form quinone structures, with consequent production of the superoxide radical has been shown. Appel, H. M., *J. Chem Ecology.*, 19:1521–1552 (1993). It is also well documented that phenolic compounds undergo autoxidation to produce hydrogen peroxide. Pueyo and Ariza Id., Leanderson and Tagesson, Id.

EXAMPLE VI

Example VI describes one-electron oxidation with iron and manganese.

The Gt chelator, in the presence of iron, promotes a one-electron oxidation reaction to produce ethylene from the reagent 2-keto-4-thiomethyl butyric acid (KTBA) (Goodell et al., *Proc. 6th Int'l Conf. Biotech. in the Pulp and Paper Industry*, Vienna, Austria (In Press) (1995)). In work by Chandhoke, *FEMS Microbiol. Letters*, 90:236–266 (1992), ethylene production at pH 4.8, in the presence of the chelator, increased with iron or manganese concentration in the reaction mixture; however, the reaction with manganese was less than that observed with iron. When $H_2O_2$ was used in similar reactions at pH 4.0 the rates of ethylene production were markedly increased when the Gt chelator and iron were present as reactants. At this pH however, $H_2O_2$ alone also promoted the oxidation of the KTBA to a lesser extent (Lu et al. 1994). Similar to the assays for hydroxyl radical production, oxidation was reduced when the reactions were carried out in a nitrogen environment indicating that molecular oxygen in addition to $H_2O_2$ is necessary to promote oxidative reactions. Superoxide dismutase also was observed to reduce ethylene production from the oxidation of KTBA.

EXAMPLE VII

Example VII describes the electron paramagnetic properties of iron in the presence of the Gt chelator and oxalate.

The derivative EPR signal amplitude (peak to trough) has been used previously as a measure of iron sequestration by chelators (Ecker et al., *J. Biol. Chem.*, 257:8623–8626 (1982)) and was used previously (Goodell and Yamamoto, unpublished) to determine the iron binding capacity of the Gt chelator. Freshly prepared iron (10 mM Fe III) in aqueous solution with 200 μM Gt chelator produced a derivative EPR signal indicative of an iron-chelate radical. Iron (10 mM Fe III) in the presence of 33 mM oxalate produced an EPR derivative signal that was approximately one-tenth the amplitude of the iron-Gt chelator complex. When both iron and oxalate were present in solution with the chelator, the derivative signal amplitude increased to approximately equal the additive signals of both iron-Gt chelator and iron-oxalate complexes. When increasing amounts of ferric iron were added to a 33 mM oxalate solution in the presence of 200 μM Gt-chelator in unbuffered solutions, an increase in signal amplitude was observed corresponding to an increase in iron concentration.

When oxygenated iron solutions were used instead of freshly prepared ferric iron, the effect of oxalate in sequestering iron from the iron-oxide complexes to make iron available to the Gt chelator could be observed by the increase in signal amplitude when oxalate and the Gt chelator were present in the reaction mixture. Ferrous iron in the presence of the Gt chelator was EPR silent, as was ferrous iron in the presence of oxalate and chelator. When hydrogen peroxide was present in the reaction mixture with Fe II and the Gt chelator, the iron was oxidized to the ferric state where it was then bound by the Gt chelator to produce an EPR signal.

In environments where free iron is limited as in most natural environments which permit fungal activity, chelators produced by fungi could scavenge for limited amounts of iron made available by oxalate. Oxidants reacting with iron reduced by the Gt chelator then could initiate redox cycling reactions of this metal permitting the production of relatively large amounts of reactive oxygen species from limited amounts of iron.

EXAMPLE VIII

Example VIII describes immunological studies for the detection of benzene derivative chelators.

The enzyme-linked immunosorbent assay (ELISA) is a serological technique which has been previously used for the detection and quantification of fungal metabolites in wood (Goodell and Jellison 1988, Jellison and Goodell 1988). For our current work, polyclonal antisera was produced to a HPLC-purified benzene derivative iron-binding chelator fraction. The chelator fraction was purified from the extracellular filtrate of *G. trabeum* grown in liquid culture. Ultrafiltration, ethyl acetate extraction and HPLC purification were as outlined above in sections concerning isolation and characterization of the Gt chelator. The inject antigen consisted of two pooled HPLC peaks and was shown to be CAS positive and phenolic in character (Easwaren, Master of Science thesis. University of Maine, Orono, Me. (December, 1994)). Chelators were conjugated to bovine serum albumin (BSA) prior to use as inject antigens to improve their antigenicity and a polyclonal antisera was subsequently produced as previously described (Goodell and Jellison, Int'l Res. Group on Wood Preservation Series, Stockholm, Sweden, Document IRG/WP 1305 (1986)). Antisera purification and ELISA procedures were as detailed previously (Goodell and Jellison, *Forest Products Journal*, 38:59–62 (1988)).

Antisera reacted quantitatively with the Gt chelator inject antigen and also showed strong reactivity against the partially purified ethyl acetate extracts from *G. trabeum* grown in liquid culture. Detection and quantification of the antigen was possible at concentrations as low as approximately 16 μM ethyl acetate extract. In the same study *G. trabeum* infected spruce (*Picea rubens*) wood gave a very strong ELISA reaction at dilutions down to 280 μg/ml and reacted quantitatively with the antibody down to a dilution equivalent of 12 μg wood shavings per ml buffer. Non-infected spruce wood showed no significant reaction in ELISA. This work indicates that the Gt chelator antibodies made against fungal metabolites produced in culture also react strongly with homologous compounds found in *G. trabeum* degraded wood but which are not found in non-infected wood.

The antibody made to the Gt-chelator also reacted with spruce wood infected with the brown rot fungus *Postia placenta*, suggesting that similar compounds are found in wood degraded by at least one other brown rot fungus. These compounds could be of fungal origin and/or modified lignin breakdown products but appear to be present only in the samples of brown rot degraded wood and not in the non-infected control wood. It should also be noted that especially in the *G. trabeum* degraded wood samples, the serological data suggest a high initial concentration of these compounds in the degraded wood is maintained through more advanced decay stages.

Immuno Transmission Electron Microscopy

Polyclonal antibodies produced as outlined in Jellison, et al., *Appl. Micro. and Biotech.*, 35:805–809 (1991) to the partially purified chelator fraction was used to label wood degraded by *G. trabeum* in an immunogold labelling procedure. The Gt chelator was found localized at the plasma membrane and cell wall of the fungus and internally within the hyphal cytoplasm. Labeling within the wood cell wall was observed throughout, but the Gt chelator was localized in higher concentration in the more highly degraded, (lower electron dense) regions of the cell wall confirming the presence of the Gt chelator in the degraded wood and illustrating the relationship between cell wall degradation and Gt chelator activity (Jellison et al., Int'l Res. Group on Wood Preservation Series, Stockholm, Sweden, Document IRG/WP 1479 (1991)).

EXAMPLE IX

Example IX describes depolymerization of cellulose.

Alpha-cellulose was exposed to the Gt chelator in the presence of iron with hydrogen peroxide in a buffered solution. Appropriate controls were also analyzed. Reaction mixtures were stirred at room temperature for three hours before the cellulose was recovered by centrifugation, washing in deionized water, and air drying. The air dried samples were then further dried at 105° C., and phenol isocyanate derivatives prepared as described by Wood et al., *J. App. Polymer Sci.*, 32:3703–3712 (1986) and Kleman-Leyer et al., *Appl. Environ. Microbiol.* 58:1266–1270 (1992) for gel permeation chromatography (GPC). Pyridine was evaporated from the derivatives and the residue redissolved in acetone. The acetone was evaporated under vacuum, the sample redissolved in tetrahydrofuran, and then filtered through a 2 μm cellulose membrane. A Metacel 5 linear GPC column was used with a Hitachi L-4500 diode array detector for determination of DP.

The GPC results show that the Gt chelator in the presence of iron and hydrogen peroxide will degrade cellulose. This is indicated by a change in the sharp, skewed GPC peak, characteristic of the higher DP control cellulose. As cellulose is degraded, broader, tailed peaks representative of lower molecular weight products that are retained longer on the GPC column are observed. The samples treated with Gt chelator, iron, and hydrogen peroxide display a greater proportion of lower DP cellulose indicating the relative degree of depolymerization of degraded cellulose as compared to the controls. Increasing the amount of Gt chelator in the reaction mixture increased the amount of lower DP residues in the sample. The chromatogram for the freshly prepared Fe III and hydrogen peroxide treated cellulose displayed a slight skew from that of the control cellulose indicating a limited amount of cellulose depolymerization. High concentrations of free Fe III do not occur in natural environments which favor fungal activity, and a free iron mechanism for degradation of cellulose therefore would not be active in fungal degradation processes.

We have also observed that using Gt chelator together with hydrogen peroxide and iron can promote reactions in wood which result in a delamination in the region of the S1/Primary wood cell wall, thus improving separation of the lignin-rich middle lamellae region from the wood fiber which may therefore provide improved means of delignifying/bleaching wood or wood pulp.

EXAMPLE X

Example X describes the oxidative degradation of phenolic substrates.

Pentachlorophenol (PCP) was used in this study, not as a lignin substrate but as a measure of the Gt chelator's capacity to generate oxygen radical species in a manner that would effect degradation of a chlorinated aromatic compound commonly regarded as one of the most difficult to degrade xenobiotics when found as a contaminant in soil and water environments. Pentachlorophenol (25 μM) in aqueous solution was incubated in various combinations with the Gt chelator, iron of different valence states, and hydrogen peroxide. All reactions were carried out at pH 4.0.

PCP was degraded significantly in the presence of the Gt chelator, iron, and hydrogen peroxide. Either valence state of iron may be used, as redox cycling of the Gt chelator will allow ferric iron to be reduced for reaction with hydrogen peroxide. Although other reactants without the Gt chelator reduce the concentration of PCP in the reaction mixture to a lesser extent under the conditions tested, and the chelator with iron alone also promotes limited degradation, rapid degradation occurs only in the presence of the Gt chelator, iron, and $H_2O_2$. It is interesting to note that when ferrous iron and hydrogen peroxide are present alone, even though these reagents would produce hydroxyl radicals in a Fenton reaction, degradation does not proceed as rapidly as when the Gt chelator is present in the reaction mixture. Previous researchers have reported that the degradation of non-polar organic molecules, including a variety of aromatic and hydrocarbon compounds by Fenton's reagent alone is limited (U.S. Pat. No. 5,232,484 to Pignatello 1993, Carberry and Sang, *Emerging Technologies in Hazardous Waste Management IV*, Tedder and Pohland (Eds.), ACS Symp. Ser. 554. pp. 197–223 (1994). The increased degradation of PCP mediated by the Gt chelator may be due to the promotion of redox cycling activity to continually provide iron in a form readily available for reaction with hydrogen peroxide. Alternate pathways for the production of oxidant species such as $H_2O_2$, permitting the short lived hydroxyl radical to be formed in close proximity to the pentachlorophenol molecules could also possibly be involved.

EXAMPLE XI

Example XI describes trichlorophenol degradation by the *Gloeophyllum trabeum* chelator and degradation of pentachlorophenol mediated by the chelator 2,3 dihydroxybenzoic acid.

To ascertain whether the chelator mediated system, could degrade other chlorinated xenobiotics, experiments were performed with 2,4,6-trichlorophenol (TCP), instead of pentachlorophenol (PCP). A 25 μM aqueous solution of TCP was incubated in various combinations with the *Gloeophyllum trabeum* (Gt) chelator (40 μM); iron (ferric iron (200 μM), ferrous, or no iron (control)); and hydrogen peroxide (2 mM).

The reaction mixtures were incubated at room temperature in the dark for approximately a twenty hour period at pH 4.0. The mixtures were periodically analyzed using HPLC to monitor the concentration of TCP using a PHENOMENEX PRODIGY ODS2 (250×3.20 mm) reverse phase analytical column. The mobile phase was 65% methanol and 35% sodium acetate (50 mM), with a flow rate of 0.5 ml/minute. The TCP concentration was monitored at 221 nm at regular intervals using a diode array detector.

An additional experiment with the phenolate (i.e., benzene derivative) chelator 2,3 dihydroxy benzoic acid (DHBA) (20 μM) with pentachlorophenol (25 μM), $H_2O_2$ (2 mM), and with either Fe III (400 μM)/Fe II (400 μM), or no iron. The experiment was performed under similar conditions to that described above to determine if this chelator would function similarly in mediating the degradation of PCP.

Results show that approximately 14% of TCP was degraded in the presence of the Gt chelator in as little as 2.5 hours. The TCP removal rate, in the presence of Gt chelator, iron and hydrogen peroxide was similar to that of the PCP degradation experiment and it is anticipated that similar removal of TCP (up to and beyond 90%) could be acheived with increased time and addition of hydrogen peroxide. Results also show that DHBA in the presence of various combinations of iron and hydrogen peroxide was capable of degrading PCP. Nearly 45% of the PCP in the reaction mixture was removed by the action of DHBA in the presence of Fe II with an initial pulse of hydrogen peroxide. Modelling studies of the reaction rates indicate that the DHBA and iron are recycled in the system, and concentrations of hydrogen peroxide may be the only limiting factor for the reaction. This was substantiated by experiments showing that the introduction of small aliquots of hydrogen peroxide to the system resulted in an increase in the PCP removal rate. Similar modelling results were obtained in experiments with Gt chelator mediated degradation of PCP.

All publications and patents mentioned in this specification are herein incorporated by reference into the specification to the same extent as if each individual publication or patent was specifically and individually indicated to be incorporated herein by reference.

What is claimed is:

1. A non-enzymatic method of oxidizing a target substrate comprising the steps of:
   i. solubilizing a metal ion form a metal oxy(hydr)oxide compound with an iron oxy(hydr)oxide solubilizing chelator to yield a first soluble metal ion chelate complex;
   ii. transferring the metal ion form the chelate complex to a free redox cycling chelator to from a second metal ion chelate complex which reduces the metal ion to a reduced metal species;
   iii. reacting the reduced metal species with an oxygen containing oxidant to yield a reactive oxygen species and a free redox cycling chelator; and
   iv. oxidizing the target substrate by contacting the substrate with the reactive oxygen species.

2. The method of claim 1, wherein the metal ion is a transition metal ion.

3. The method of claim 2, wherein the transition metal ion is a trivalent ion.

4. The method of claim 3, wherein the transition metal ion is Fe(III) or Mn(III).

5. The method of claim 1, wherein the target substrate is a polyphenolic, chlorinated hydrocarbon, polysaccharide, pesticide, wood pulp, or lignin.

6. The method of claim 5, wherein the chlorinated hydrocarbon is pentachlorophenol, trichlorophenol, carbon tetrachloride, trichloroethylene, or chlorinated lignin derivatives.

7. The method of claim 1, wherein the iron oxy(hydr)oxide solubilizing chelator is oxalic acid, phosphoric acid, phosphonic acid, or a conjugate base thereof.

8. The method of claim 1, wherein chelation of the metal ion with the iron oxy(hydr)oxide solubilizing chelator is in an acidic medium.

9. The method of claim 1, wherein the redox cycling chelator is hydroquinone, EDTA, catechol, quinoline, or substituted derivatives thereof.

10. The method of claim 1, wherein the redox cycling chelator is obtained from Gloeophyllum spp.

11. The method of claim 1, wherein the oxygen containing oxidant is hydrogen peroxide, hydroperoxide, peroxide, ozone, singlet oxygen, or permanganate.

12. The method of claim 1, wherein the target substrate is oxidized in an aerated environment.

13. A non-enzymatic method of forming reactive oxygen species comprising the steps of:
   i. solubilizing a metal ion from a metal oxy(hydr)oxide compound with an iron oxy(hydr)oxide solubilizing chelator to yield a first soluble metal ion chelate complex;
   ii. transferring the metal ion form the chelate complex to a free redox cycling chelator to form a second metal ion chelate complex which reduces the metal ion to a reduced metal species; and
   iii. reacting the reduced metal species with an oxygen containing oxidant to yield a free redox cycling chelator and a reactive oxygen species.

14. The method of claim 13, wherein the metal ion is a transition metal ion.

15. The method of claim 14, wherein the transition metal ion is a trivalent ion.

16. The method of claim 15, wherein the transition metal ion is Fe(III) or Mn(III).

17. The method of claim 13, wherein the iron oxy(hydr)oxide solubilizing chelator is oxalic acid, phosphoric acid, phosphonic acid, or a conjugate base thereof.

18. The method of claim 1, wherein chelation of the metal ion with the iron oxy(hydr)oxide solubilizing chelator is in an acidic medium.

19. The method of claim 13, wherein the redox cycling chelator is hydroquinone, EDTA, catechol, quinoline, or substituted derivatives thereof.

20. The method of claim 13, wherein the redox cycling chelator is obtained from Gloeophyllum spp.

21. The method of claim 13, wherein the oxygen containing oxidant is hydrogen peroxide, hydroperoxide, peroxide, ozone, singlet oxygen, or permanganate.

22. A non-enzymatic method of forming reactive oxygen species by contacting a reduced metal species with an oxygen containing oxidant comprising:
   i. reacting a free redox cycling chelator with a molar excess of oxidized metal species to yield a reduced metal ion chelate complex;
   ii. reacting the reduced metal ion chelate complex with an oxygen containing oxidant to yield a free redox cycling chelator, reactive oxygen species and an oxidized metal species; and
   iii. reacting the free redox cycling chelator to step ii. with an oxidized metal species.

23. The method of claim 22, wherein the oxidized metal species is an oxidized transition metal.

24. The method of claim 23, wherein the oxidized transition metal is a trivalent cation.

25. The method of claim 24, wherein the trivalent cation is Fe(III).

26. The method of claim 22, wherein the free redox cycling chelator is hydroquinone, EDTA, catechol, quinoline, or substituted derivatives thereof.

27. The method of claim 22, wherein the oxygen containing oxidant is hydrogen peroxide, hydroperoxide, peroxide, ozone, singlet oxygen, or permanganate.

* * * * *

UNITED STATES PATENT AND TRADEMARK OFFICE
CERTIFICATE OF CORRECTION

PATENT NO.    : 6,046,375
DATED         : April 4, 2000
INVENTOR(S)   : Goodell, et al.

It is certified that error appears in the above-identified patent and that said Letters Patent is hereby corrected as shown below:

Column 21,
Line 8, delete "form" and insert therefor --from--.

Signed and Sealed this

Nineteenth Day of June, 2001

Attest:

*Attesting Officer*

NICHOLAS P. GODICI
*Acting Director of the United States Patent and Trademark Office*